United States Patent
Glaser

(10) Patent No.: US 9,760,525 B2
(45) Date of Patent: Sep. 12, 2017

(54) SIDEBAND SIGNAL CONSOLIDATION FANOUT USING A CLOCK GENERATOR CHIP

(71) Applicant: Nvidia Corporation, Santa Clara, CA (US)

(72) Inventor: Steve Glaser, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 223 days.

(21) Appl. No.: 14/813,826

(22) Filed: Jul. 30, 2015

(65) Prior Publication Data
US 2017/0031863 A1    Feb. 2, 2017

(51) Int. Cl.
*G06F 13/42* (2006.01)
*G06F 1/12* (2006.01)
*G06F 13/40* (2006.01)

(52) U.S. Cl.
CPC ............ *G06F 13/4291* (2013.01); *G06F 1/12* (2013.01); *G06F 13/4022* (2013.01)

(58) Field of Classification Search
None
See application file for complete search history.

(56) References Cited

U.S. PATENT DOCUMENTS

2016/0170929 A1*   6/2016   Pethe ................... G06F 13/102
                                                              710/313

* cited by examiner

*Primary Examiner* — Cheng-Yuan Tseng
(74) *Attorney, Agent, or Firm* — Rich Domingo; Parker Justiss, P.C.

(57) ABSTRACT

A clock generator chip, a PCI Express port and a computing device control board are provided herein. In one embodiment the clock generator chip includes: (1) a clock generator configured to generate a reference clock signal for a component in response to a clock request from the component, (2) a reference clock pin configured to provide the reference clock signal and (3) a pair of sideband signal pins configured to receive and transmit sideband packets between the component and the clock generator chip.

20 Claims, 2 Drawing Sheets

SIDEBAND SIGNAL CONSOLIDATION FANOUT USING A CLOCK GENERATOR CHIP

TECHNICAL FIELD

This application is directed, in general, to Peripheral Component Interconnect (PCI) Express devices, and more specifically, to the communication of sideband signals in PCI Express systems.

BACKGROUND

A PCI Express connection provides a general purpose interconnect for computing and communicating platforms. PCI Express components communicate over a point-to-point communication channel known as a link that provides a high speed, serial connection between the PCI Express components. Packets, such as Transaction layer packets (TLPs), are communicated over the link according to the PCI Express protocol.

In addition to the high speed signals communicated via the PCI Express link, sideband signals can also be communicated between PCI Express components. A sideband signal is a physical signal that is separate from the signals forming the main link between two PCI Express components. Thus, the PCI Express protocol provides a method for signaling events and conditions using physical signals separate from the signals forming the link between two PCI Express components. The WAKE# mechanism is an example of a sideband signal used in the PCI Express protocol to implement wakeup functionality.

SUMMARY

In one aspect, the disclosure provides a clock generator chip. In one embodiment the clock generator chip includes: (1) a clock generator configured to generate a reference clock signal for a component in response to a clock request from the component, (2) a reference clock pin configured to provide the reference clock signal and (3) a pair of sideband signal pins configured to receive and transmit sideband packets between the component and the clock generator chip.

In another aspect, the disclosure provides a PCI Express port. In one embodiment, the PCI Express port includes: (1) an interface having connectors that transmit and receive PCI Express packets and (2) sideband communication logic configured to generate sideband packets and transmit the sideband packets to a sideband reproducer located external the PCI Express port.

In yet another aspect, the disclosure provides a computing device control board. In one embodiment, the computing device control board includes (1) a PCI Express port and (2) a clock generator chip having: (2A) a clock generator configured to generate a reference clock signal for the PCI Express port in response to a clock request from the PCI Express port, (2B) a reference clock pin configured to provide the reference clock signal and (2C) a pair of sideband signal pins configured to receive and transmit sideband packets between the PCI Express port and the clock generator chip.

BRIEF DESCRIPTION

Figure 1:
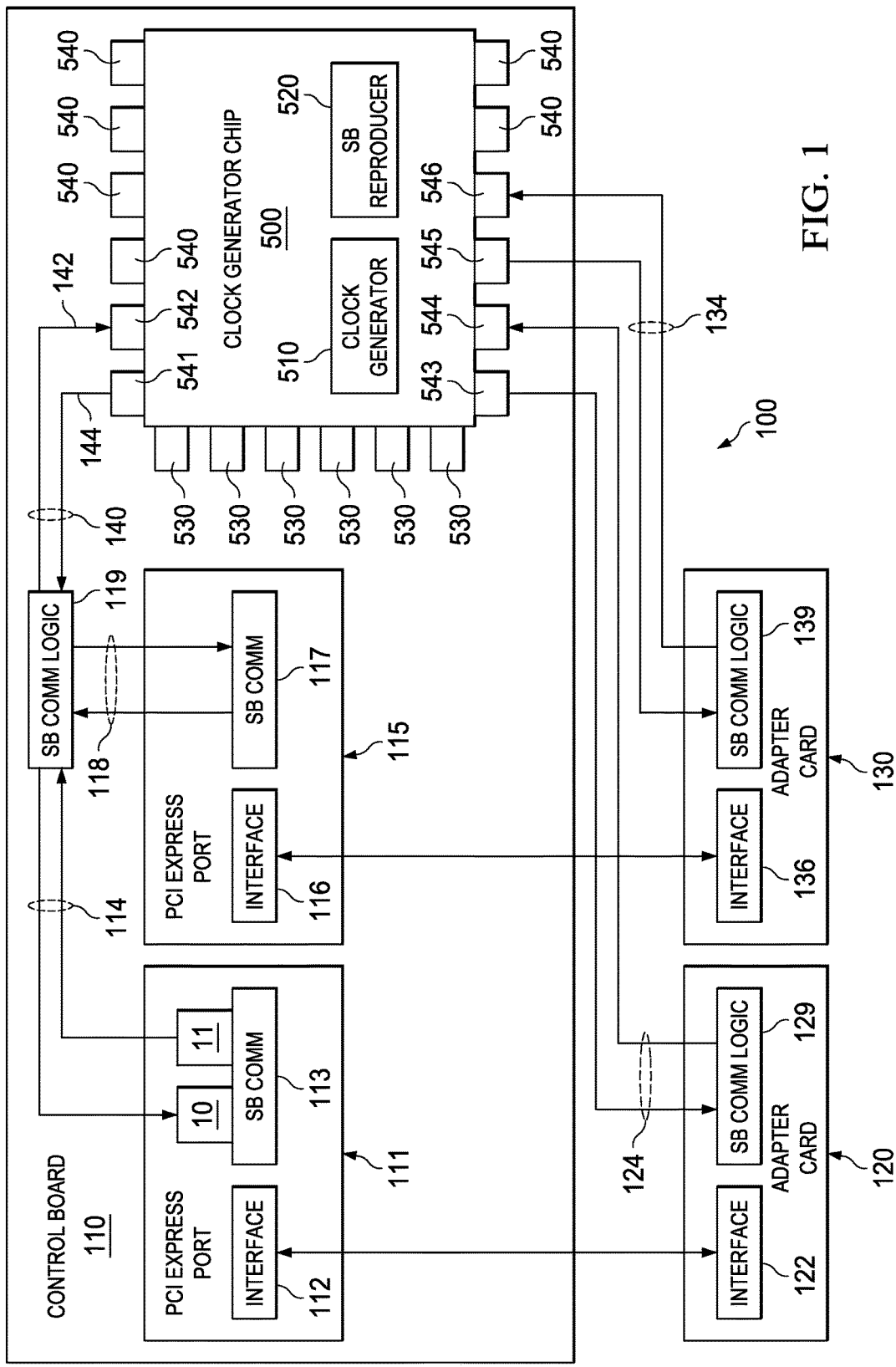
Figure 2:
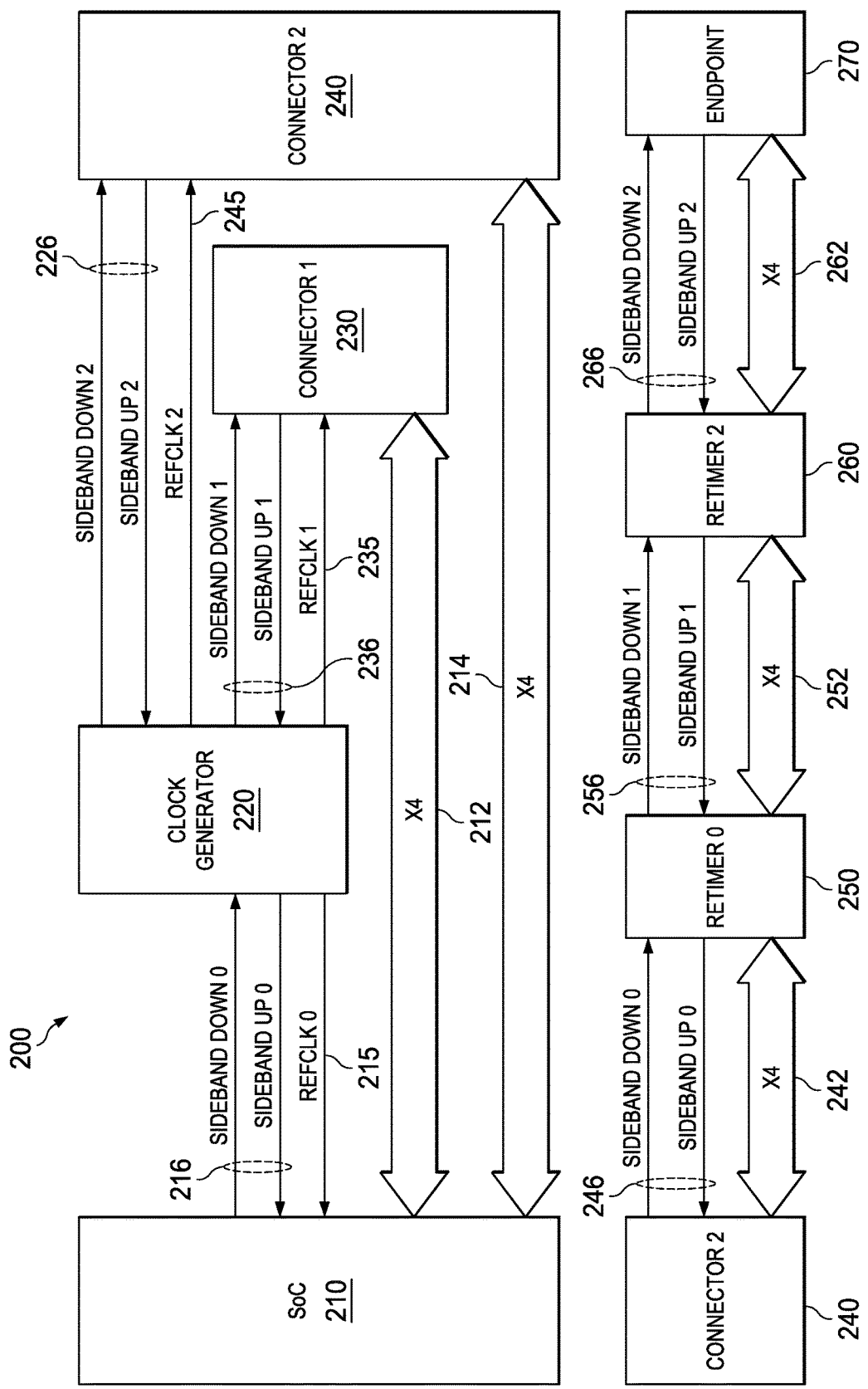

Reference is now made to the following descriptions taken in conjunction with the accompanying drawings, in which:

FIG. 1 illustrates a block diagram of an embodiment of a computing system constructed according to the principles of the disclosure; and FIG. 2 illustrates a diagram of an embodiment of a PCI Express system showing the flow of sideband packets according to the principles of the disclosure.

DETAILED DESCRIPTION

Some PCI Express components are connected to various electromechanical and/or mechanical form factor connectors (i.e., form factors). M.2, formerly known as the Next Generation Form Factor (NGFF), is one example of a form factor currently being used. Examples of other form factors include Mobile, PCI-like form factors and modular, cartridge form factors. In some PCI Express systems sideband signaling can be used with the form factors. Different form factors can employ different sideband signals and can increase the requirement for pins needed for sideband signals. As such, current and future form factor specifications may require the implementation of some optional features for PCI Express communications.

Additionally, PCI Express supports splitting of downstream PCI Express ports. For example, a single port with sixteen lanes can be split into two ports with eight lanes. As such, then twice as many sideband signals are needed for the split. This requires additional pins. However, an increase in the number of general purpose input/output (GPIO) pins cost area and power per port.

To address the above deficiencies, the disclosure provides a clock generator chip that includes a sideband signal consolidation fanout. It is realized herein that the clock generator chip already deals with one sideband signal, the clock request (CLKREQ#) signal, in PCI Express systems. As such, in some disclosed embodiments a clock generator chip can advantageously employ an additional pin with the pin already dedicated to a sideband signal to form a dedicated pair of pins for sideband signals.

Accordingly, the disclosure provides a scalable sideband architecture that can reduce the number of GPIO pins required and enable voltage migration to better work with advanced process technologies. In embodiments provided herein, the disclosed architecture consolidates sideband signals on two pins, enables voltage migration by operating at 0.8 volts to 1.8 volts (instead of, for example, operating at 3.3 volts), and preserves current sideband timing and functionality according to the PCI Express protocol.

The disclosure advantageously employs a clock generator chip to provide an architecture that is protocol, form factor and connector agnostic. The disclosed system allows components to discover protocol, form factor and connectors during initialization and use existing signaling and encoding. For example, pulse width modulation can be used as the signaling mode and the needs of wireless modules can be addressed with a transmission frequency range between 12 Mbps to 36 Mbps that includes 19.2 MHz. Low power, low gate count receivers can also be implemented without the need for a forwarded clock or CDR.

Turning now to the Figures, FIG. 1 illustrates a block diagram of an embodiment of a computing system 100 constructed according to the principles of the disclosure. The computing system 100 can be a computer, such as a desk top computer or a lap top computer, or another computing device including a tablet and a smart phone. The computing system 100 includes a control board 110, an adapter card 120 and an adapter card 130.

The control board 110 is configured to direct the operation of the computing system 100. In one embodiment, the control board 110 is a motherboard of the computing system 100. The control board 110 includes a first PCI Express port 111, a second PCI Express port 115, sideband communication logic 119 and a clock generator chip 500. Each of these components of the control board 110 can be connected via conventional connections employed on a motherboard. One skilled in the art will understand that the control board 110 can include additional components that are typically included on a motherboard, such as a processor (e.g., a CPU), flash memory and input/output controllers.

The first PCI Express port 111 and the second PCI Express port 115 include an interface 112 and an interface 116, respectively, that are configured to transmit and receive PCI Express packets. The interfaces 112, 116, can be conventional components of PCI Express ports that are configured to communicate PCI Express packets over a link. For example, the interfaces 112, 116, can include a group of transmitters and receivers that define a PCI Express link and communicate PCI Express packets.

The PCI Express ports 111, 115, also include sideband communicators 113, 117, respectively. The sideband communicators 113 and 117 are configured to communicate sideband signals for their respective PCI Express ports. For example, the sideband communicators 113, 117, are configured to transmit clock requests for the PCI Express ports 111, 115. The clock requests can be "CLKREQ" packets according to the Sideband Communication Protocol for PCI Express ports. The sideband communicators 113, 117, are each connected to the sideband communication logic 119 via a sideband bus. Sideband bus 114 connects sideband communicator 113 to sideband communication logic 119 and sideband bus 118 connects sideband communicator 117 to sideband communication logic 119. Sideband bus 114 and sideband bus 118 include a connection for transmitting sideband packets to the sideband communication logic 119 and a connection for receiving sideband packets from the sideband communication logic 119. Each of the sideband buses employs two pins for communicating sideband signals. Thus, instead of requiring multiple GPIO pins for different sideband signals, two pins can be used to communicate the sideband signals via a sideband bus. A pair of sideband signal pins, 10 and 11, is illustrated in FIG. 1 for the sideband bus 114 at the sideband communicator 113 and to represent sideband signal pins of PCI Express ports. Except for those of the clock generator chip 500, the pair of pins that are used for the other sideband busses of FIG. 1 are not illustrated. Other sideband signals communicated over the sideband buses in addition to the clock requests can include wake requests, power gating, detect presence and fundamental reset. In some embodiments, the sideband communicators 113, 117, can be part of or within the interfaces 112, 116. For example, the sideband signal pins 10 and 11 can be additional pins of the interface 112.

The sideband communication logic 119 is configured to communicate sideband packets between the sideband communicators 113, 117, and the clock generator chip 500. In addition to being connected to the sideband communicators 113, 117 via sideband buses, the sideband communication logic 119 is also connected to the clock generator chip 500 via a sideband bus 140. The sideband bus 140 also includes a connection for transmitting sideband packets to the clock generation chip 500 and a connection for receiving sideband packets from the clock generation chip 500. The transmitting connection is specifically designated as connection 142 and the receiving connection is specifically designated 144.

The sideband communication logic 119 is configured to receive sideband packets from the sideband communicators 113, 117, and transmit the received sideband packets to the clock generator chip 500 over the transmit connection 142 of the sideband bus 140. The sideband communication logic 119 is also configured to receive sideband packets from the clock generator chip 500 via the receiving connection 144 of the sideband bus 140, determine the destination of the received sideband packets and transmit the received sideband packets to either of the sideband communicators 113, 117, based on the results of the determination. In one embodiment, the sideband communication logic 119 determines the desired destination from a field of the sideband packet and then transmits the sideband packet to the desired sideband communicator 113, 117, via the appropriate sideband bus 114 or 118. In some embodiments, the sideband communication logic 119 can include a routing table that is used to direct the sideband packets to the appropriate PCI Express port 111 or 115.

In addition to logic for communicating sideband packets, the sideband communication logic 119 also includes a phased-locked-loop (PLL) that is used to provide clock signals to the PCI Express ports 111, 115. The PLL is a shared PLL between the two PCI Express ports 111, 115, and provides a clock signal to a requesting PCI Express port 111, or 115, in view of a reference clock signal received from the clock generator chip 500 via a reference clock pin 530.

The clock generator chip 500 is configured to generate reference clock signals in response to receiving clock requests from the various components of the computing system 100. Unlike a conventional clock generator chip, the clock generator chip 500 is also configured to replicate and route sideband packets. The clock generator chip 500 includes a clock generator 510, a sideband reproducer 520, reference clock pins 530 and sideband signal pins 540. The sideband reproducer 520, as are the sideband communicators 113, 117, and the sideband communication logic 119, 129, 139, is implemented in hardware.

The clock generator 510 is a conventional component that generates reference clock signals. The clock signals, such as reference clock signals, are sent to a component in response to a request from the component. The clock signals are transmitted via a reference clock pin 530 that is connected to the requesting component. The sideband reproducer 520 is configured to replicate and route sideband signals. The sideband reproducer 520 is connected to the sideband signal pins 540, or at least some of sideband signal pins 540, and is configured to receive sideband packets, determine a destination for the sideband packets, determine the appropriate sideband signal pin that corresponds to the determined destination and transmit the sideband packet to the determined destination via the appropriate sideband pin 540. Sideband pin 540 or sideband pins 540 are used generally to refer to the sideband pins of the clock generator chip 500 in FIG. 1. Some of the sideband pins 540 have a specific designation for ease of discussion. For example, the sideband reproducer 520 receives a sideband packet from the sideband communicator 113 via the sideband communication logic 119 and sideband pin 542, and determines the destination for the sideband packet is adapter card 120. The sideband reproducer 520 determines the sideband pin 543 is for transmitting sideband packets to the adapter card 120 and transmits the sideband packet to the sideband communication logic 129 of the adapter card 120 via the sideband pin 543.

The adapter card 120 and the adapter card 130 are printed circuit boards that are connected to the control board 110 via an electrical connector, such as an expansion slot. The adapter cards 120, 130, can provide peripheral functions or expansion for the computing system 100. The adapter cards 120, 130, can also be referred to as expansion cards, accessory cards or option cards. In one embodiment, at least one of the adapter cards 120, 130, is a graphics card.

Like the PCI Express ports 111, 115, the adapter cards 120, 130, include interfaces that are configured to transmit and receive PCI Express packets over a link. The interfaces are the interface 122 of the adapter card 120 and the interface 136 of the adapter card 130. The adapter cards 120, 130, also include sideband communication logic 129, 139, respectively. The sideband communication logic 129, 139, are similar to the sideband communication logic 119 since they also include logic to receive sideband packets from and transmit sideband packets to the clock generator chip 500. In some embodiments, the sideband packets include a data field indicating a destination address of each of the sideband packets that is employed by the sideband reproducer 520 to direct each of the sideband packets to the correct destination.

Each of the sideband communication logic 129, 139, also includes a PLL. However, unlike the sideband communication logic 119, the PLL of each sideband communication logic 129, 139, is not shared but instead in dedicated to the particular adapter card. In some embodiments, the sideband communication logic 129, 139, can be part of or within the interfaces 122, 136. The interfaces and sideband communication logic, such as interface 122 and sideband communication logic 129, can be considered a PCI Express port similar to the PCI Express ports 111, 115.

FIG. 2 illustrates a diagram of an embodiment of a PCI Express system 200 showing the flow of sideband packets according to the principles of the disclosure. The PCI Express system 200 includes a System on Chip (SOC) 210, a clock generator chip 220, a first connector 230, a second connector 240, a first retimer 250, a second retimer 260 and an endpoint 270. The various components of the PCI Express system 200 are connected via conventional PCI Express connections (i.e., links) that provide in-band signaling of PCI Express packets according to the PCI Express protocol and by sideband buses as disclosed herein. The main band PCI Express connections between the various components of FIG. 2 are each a four lane connection. Each of the sideband buses include a transmit connection and a receive connection that are connected to transmit sideband packets and receive sideband packets, respectively.

The SOC 210 is connected to the first connector 230 via PCI Express connection 212 and to the second connector 240 via PCI Express connection 214. The first connector 230 and the second connector 240 can be form factors. The SoC 210 is also connected to the clock generator chip 220 via a sideband bus 216. The clock generator chip 220 is also connected to the first connector 230 via a sideband bus 236 and to the second connector 240 via the sideband bus 226. The clock generator chip 220 is configured to select the clock request signal from the received sideband packets and respond thereto by sending the appropriate reference clock signal to the requesting component over a conventional clock line. A bit in a designated field of the sideband signals can be used to indicate a clock request. The clock lines in FIG. 2 are 215, 235 and 245, respectively.

In addition to detecting clock requests and responding with reference clock signals, the clock generator chip 220 is configured to replicate and route the sideband signals to their destination. As such, the clock generator chip 220 is configured to operate as a sideband signal router and fan the received sideband signals out to multiple components if needed. In one embodiment, the clock generator chip 220 operates as a sideband router by interpreting the sideband packets and routing the sideband packets based on address or broadcast rules. For example, sideband bus 216 includes sideband packets for both sideband bus 236 and sideband bus 226. The clock generator chip 220 is configured to detect received sideband packets that are for the first connector 230 and send these detected packets to the first connector 230 via the sideband bus 236. Similarly, the clock generator chip 220 is configured to detect received sideband packets that are for the second connector 240 and send these detected packets to the second connector 240 via the sideband bus 226.

In one embodiment, the clock generator chip 220 includes a sideband reproducer that performs the routing and replicating of sideband signals through the sideband busses. In some embodiments, the sideband busses support a register read/write mechanism for Retimer use that is also used to read/write registers in the clock generator chip 220. This is used in some embodiments to inform the clock generator chip 220 which sideband or reference clock pins are upstream and which ones are downstream, which downstream sideband or reference clock pins match which PCIe Link #, and how to configure SSC clocking.

The second connector 240 is connected to the first retimer 250 via PCI Express connection 242 and sideband bus 246. The first retimer 250 is also connected to the second retimer 260 via PCI Express connection 252 and sideband bus 256. The second retimer 260 is further connected to endpoint 270 via PCI Express connection 262 and sideband bus 266. The sideband busses 246, 256, 266, communicate sideband packets that were originally transmitted from the SoC 210 to the clock generator chip 220. Thus, instead of requiring many GPIO pins at the SoC 210, the sideband signals can be sent across the sideband bus 216 and then appropriately routed by the clock generator chip 220.

In some embodiments, the above-described methods or at least part thereof may be embodied in or performed by various conventional devices, such as digital data processors, microprocessors or computing devices, wherein these devices are programmed or store executable programs of sequences of software instructions to perform one or more of the steps of the methods. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods. Additionally, an apparatus, such as a clock generator chip, may be designed to include the necessary circuitry to perform at least some of the functions and methods of replicating and routing of sideband signals as disclosed herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A clock generator chip, comprising:
   a clock generator configured to generate a reference clock signal for a component in response to a clock request from said component;
   a reference clock pin configured to provide said reference clock signal; and
   a pair of sideband signal pins configured to receive and transmit sideband packets between said component and said clock generator chip.

2. The clock generator chip as recited in claim 1 further comprising a sideband reproducer configured to replicate said sideband packets.

3. The clock generator chip as recited in claim 1 further comprising multiple pairs of sideband signal pins and multiple reference clock pins.

4. The clock generator chip as recited in claim 3 wherein a number of said multiple pairs of sideband signal pins corresponds to a number of said multiple reference clock pins.

5. The clock generator chip as recited in claim 1 wherein a first pin of said pair of sideband signal pins is dedicated for receiving said sideband signals from said component and a second pin of said pair is dedicated to transmitting said sideband signals to said component.

6. The clock generator chip as recited in claim 3 wherein said sideband reproducer is configured to distribute at least one of said sideband signals to at least two pairs of said multiple reference clock pins.

7. The clock generator chip as recited in claim 2 wherein said sideband reproducer is further configured to identify said clock request from sideband packets received from said component.

8. The clock generator chip as recited in claim 2 further comprising multiple pairs of sideband signal pins and said sideband reproducer is configured to direct at least one of said sideband packets to said multiple pairs of said sideband signal pins that correspond to a designated destination of said one of said sideband packets.

9. The clock generator chip as recited in claim 8 wherein said sideband reproducer employs a routing table to direct said at least one of said sideband packets.

10. The clock generator chip as recited in claim 3 further comprising a sideband reproducer configured to route said sideband packets to at least one pair of said multiple pairs of sideband signal pins.

11. A Peripheral Component Interconnect (PCI) Express port, comprising:
   an interface having connectors that transmit and receive PCI Express packets; and
   sideband communication logic configured to generate sideband packets and transmit said sideband packets to a sideband reproducer located external said PCI Express port.

12. The PCI Express port as recited in claim 11 wherein said PCI Express port further includes a pair of sideband signal pins dedicated to transmit said sideband packets and receive other sideband packets from said sideband reproducer.

13. The PCI Express port as recited in claim 11 wherein at least one of said sideband packets generated by said sideband communication logic is a clock request for said PCI Express port.

14. The PCI Express port as recited in claim 11 wherein said sideband communication logic includes a phase-locked-loop.

15. The PCI Express port as recited in claim 11 wherein said sideband packets include a data field indicating a destination address of each of said sideband packets that is employed by said sideband reproducer to direct said each of said sideband packets to said destination address.

16. A computing device control board, comprising:
   a Peripheral Component Interconnect (PCI) Express port; and
   a clock generator chip, including:
   a clock generator configured to generate a reference clock signal for said PCI Express port in response to a clock request from said PCI Express port;
   a reference clock pin configured to provide said reference clock signal; and
   a pair of sideband signal pins configured to receive and transmit sideband packets between said PCI Express port and said clock generator chip.

17. The computing device control board as recited in claim 16 wherein said clock generator chip further includes a sideband reproducer configured to replicate said sideband packets.

18. The computing device control board as recited in claim 17 wherein said PCI express port includes sideband communication logic configured to communicate said sideband packets with said sideband reproducer.

19. The computing device control board as recited in claim wherein said PCI express port further includes a pair of sideband signal pins dedicated to transmit and receive said sideband packets with said pair of sideband signal pins of said clock generator chip.

20. The computing device control board as recited in claim 17 wherein said clock generator chip further includes multiple pairs of sideband signal pins and said sideband reproducer is configured to direct at least one of said sideband packets to said multiple pairs of said sideband signal pins that correspond to a designated destination of said one of said sideband packets.

* * * * *

UNITED STATES PATENT AND TRADEMARK OFFICE
CERTIFICATE OF CORRECTION

PATENT NO.          : 9,760,525 B2
APPLICATION NO.     : 14/813826
DATED               : September 12, 2017
INVENTOR(S)         : Steve Glaser Page 1 of 1

It is certified that error appears in the above-identified patent and that said Letters Patent is hereby corrected as shown below:

In the Claims

In Column 8, Line 45, after "claim" please insert --16--

Signed and Sealed this
Twentieth Day of February, 2018

Andrei Iancu
*Director of the United States Patent and Trademark Office*